United States Patent Office 3,017,499
Patented Jan. 16, 1962

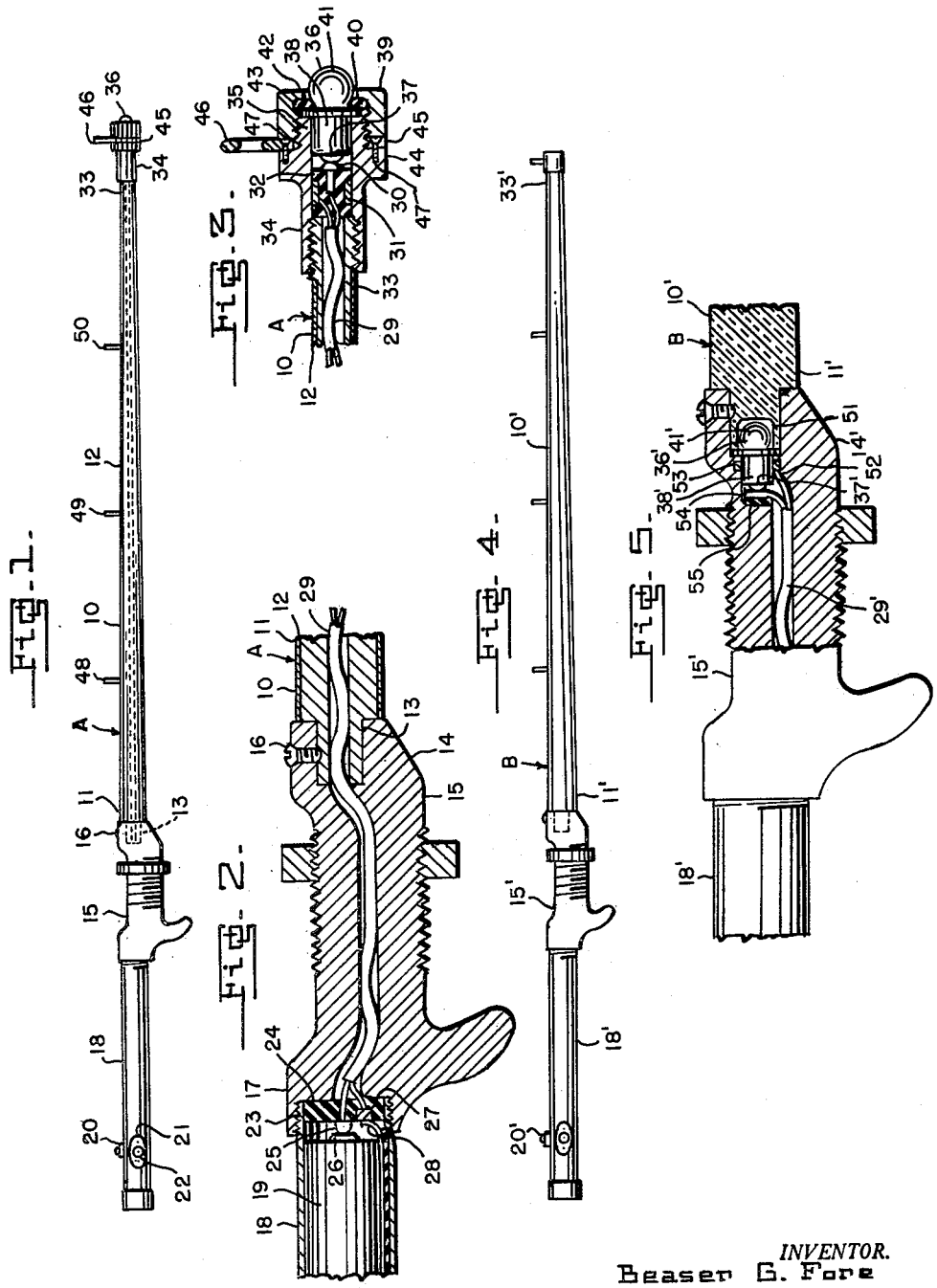

3,017,499
ILLUMINATED FISHING RODS
Beaser G. Fore, Brookneal, Va.
Filed Dec. 3, 1958, Ser. No. 777,905
1 Claim. (Cl. 240—6.4)

The present invention relates to improvements in fishing rods and more particularly to an improved illuminated fishing rod whose shaft is lighted or caused to glow throughout its entire length.

An important object of the present invention is to provide a fishing rod with completely concealed electric lighting equipment.

Another object of the invention is the provision of a fishing rod with a shaft that will constantly glow throughout its length at night and that has a switch controlled auxiliary electric light within the tip end of the shaft.

A further object is to provide a fishing rod having improved means for mounting an electric light in the tip end of the shaft.

A still further object is the provision of a fishing rod with a shaft of light-conducting material and concealed electric lighting equipment including a light bulb mounted within the butt end of the shaft to illuminate the shaft throughout its length.

Yet another object is the provision of electric lighting equipment which may readily be applied to various conventional types of fishing rods without requiring extensive changes in the construction of the fishing rods.

Other objects and advantages of the invention will become apparent during the course of the following detailed description taken in connection with the accompanying drawing forming a part of this specification and in which drawing, FIG. 1 is a side elevational view of a preferred form of my illuminated fishing rod.

FIG. 2 is a fragmentary detail sectional view of the handle, reel holder and butt end of the shaft of the fishing rod shown in FIG. 1.

FIG. 3 is a fragmentary detail sectional view of the shaft tip end light socket of the fishing rod shown in FIG. 1.

FIG. 4 is a side elevational view of a modified form of my illuminated fishing rod.

FIG. 5 is a fragmentary detail view, partly in side elevation and partly in central vertical section of the handle, reel holder and shaft butt end of the fishing rod shown in FIG. 4.

In the drawing which for the purpose of illustration shows preferred and modified forms of the invention and wherein similar reference characters denote corresponding parts throughout the several views the letter A generally designates a preferred form of illuminated fishing rod as shown in FIGS. 1–3 and comprising a tubular shaft 10 which may taper from its butt end 11, may be formed of any suitable material and is coated throughout its length with a layer of luminous paint 12. This paint 12 is preferably of the type known as phosphorescent safety paint which is activated by daylight or artificial light and retains its glow all night. The butt end 11 of the shaft 10 includes a reduced portion 13 that fits into the forward end 14 of a standard reel holder 15 and is secured against removal by a set screw 16. Threaded into the after end 17 of the reel holder 15 is a tubular flash light case 18 forming a handle for the fishing rod A and holding preferably five flash light cells forming a battery 19. The flash light case 18 is equipped with the usual switch 20 and may also include a reflector 21 and light bulb 22 on its side. Disposed within the forward end 23 of the flash light case 18 is an insulative disc 24 carrying a central contact 25 engaged by the positive pole or terminal 26 of the battery 19 and another contact 27 engaged by the usual conductor strip 28 that forms a circuit going to the negative terminal or case of the battery 19 via the switch 20. Extending through the reel holder 15 and tubular shaft 10 is an insulated two wire cable 29 connecting the disc contacts 25, 27 to a central terminal 30 and an annular terminal 31 mounted in an insulative core 32 at the tip end of the shaft 10. This insulative core 32 is disposed within an aluminum socket 34 that is threaded on to the shaft tip 33. Inserted in the forward end 35 of the aluminum socket 34 is a light bulb 36 having its base contact 37 in engagement with the central terminal 30 and its base shell 38 in contact with the aluminum socket 34 so as to complete an electrical circuit to the annular terminal 31. Threaded on to the forward end 35 of the aluminum socket 34 is an end cap 39 provided with an opening 40 accommodating the bulb portion 41 of the electric light 36, this opening 40 being defined by an annular flange 42 retaining and compressing a rubber ring 43 against the bulb portion 41 and the shell portion 38 of the electric light 36 so as to provide a water tight seal. Disposed between the end cap 39 and an annular shoulder 44 on the aluminum socket 34 is a collar 45 supporting a line guide eye member 46 at the tip end 33 of the rod 10. The collar 45 supporting the line guide 46 may be removably secured to the annular shoulder 44 by small countersunk screws 47. Other line guides 48—50 are supported in spaced relation along the shaft 10 in any suitable manner.

The operation of the improved fishing rod A will now be described as it relates to night fishing. With the flash light switch 20 in its "off" position the shaft 10 will glow uniformly throughout its length thus visually informing the fisherman of its position in space and the distance of the tip end 33 of the shaft 10 above water. Moreover, the position of the fishing rod A will be evident to the fisherman during those times when it becomes necessary to set the rod aside in order to perform other fishing operations. When the switch 20 is placed in its "on" position a circuit is completed from the battery and case terminals 26, 28 to the light bulb base and shell contacts 37, 38 via the insulated two wire cable 29 concealed within the reel holder 15 and tubular shaft 10 thereby energizing the light 36 and providing an auxiliary source of light at the tip end 33 of the shaft.

Referring now to the modified form of illuminated fishing rod B shown in FIGS. 4–5, this is similar to the previously described fishing rod A in that it includes a flash light battery case 18' forming a handle and a reel holder 15' through which an insulated two wire cable 29' extends but it differs from the previously described illuminated fishing rod A in that that shaft 10' is necessarily formed of a light-conducting material such as "Plexiglas" or any other suitable type glass or any plastic that will produce reflected light upon impingement of light rays against the shaft butt end 11'. Preferably, but not necessarily, the shaft 10' is of solid in contradistinction to tubular formation and the butt end 11' is provided with a recess 51 accommodating the bulb portion 41' of an electric light 36' having its shell portion 38' mounted in the forward end 14' of the reel holder 15' as shown in FIG. 5. One of the wires 52 of the insulated two wire cable 29' is connected to an annular terminal 53 encircling the flash light base or shell portion 38' and the other wire 54 is disposed against an insulator body 55 for engagement by the base terminal 37' of the electric light 36' thus providing a circuit between the flash light battery case 18' under the control switch 20' thereon.

In the use of this modified form of fishing rod B closing the switch 20' energizes the light bulb 36' in the butt end 11' of the light-conducting shaft 10' thus directing light longitudinally of the shaft 10' from its butt end 11' to its tip end 33' and causing the reflected light to glow throughout the length of the shaft.

Various changes may be made in the forms of invention herein shown and described without departing from the spirit of the invention or the scope of the following claim:

I claim:

A fishing rod comprising a tubular shaft having a butt end and a tip end, said shaft being provided with a coating of phosphorescent paint, fishline guides carried by the shaft, a tubular reel holder comprising an after end, an intermediate reel mount portion and a forward end, said forward end being releasably affixed to the butt end of the shaft, a hollow handle releasably affixed to the after end of the reel holder, said tubular reel holder and tubular shaft forming an electric conduit extending from the handle to the tip end, and manually controllable means illuminating said shaft coating including an electric light mounted at the tip end of the shaft, a battery within the hollow handle, and means releasably electrically connecting the battery to the light including a switch on the handle and electric conductors in the conduit.

References Cited in the file of this patent

UNITED STATES PATENTS

| | | |
|---|---|---|
| 1,659,346 | Beatty | Feb. 14, 1928 |
| 1,752,397 | See | Apr. 1, 1930 |
| 2,012,894 | Shoemaker | Aug. 27, 1935 |
| 2,507,919 | Mazzeo | May 16, 1950 |
| 2,561,122 | Juergins | July 17, 1951 |
| 2,586,723 | Sakols | Feb. 19, 1952 |
| 2,646,640 | George | July 28, 1953 |
| 2,772,407 | Nichols | Nov. 27, 1956 |
| 2,812,442 | De Mun | Nov. 5, 1957 |